United States Patent [19]

Ardit et al.

[11] Patent Number: 4,942,346
[45] Date of Patent: Jul. 17, 1990

[54] CIRCUIT FOR CONTROLLING ROTATIONAL DIRECTION AND ROTATIONAL SPEED OF AN ELECTRIC MOTOR

[75] Inventors: Giuseppe Ardit, Venice; Fiorenzo Cigana, San Dona di Piave; Renzo Magris, Pordenone, all of Italy

[73] Assignee: Procond Elettronica S.p.A., Pordenone, Italy

[21] Appl. No.: 370,043

[22] Filed: Jun. 22, 1989

[30] Foreign Application Priority Data

Jul. 7, 1988 [IT] Italy .............................. 45743 A/88

[51] Int. Cl.⁵ ............................................ H02F 1/00
[52] U.S. Cl. ........................................ 318/280; 318/293
[58] Field of Search ............... 318/269, 293, 280–286, 318/438, 439, 272, 265, 278, 453, 461, 65, 71, 463; 388/816, 801, 844, 925

[56] References Cited

U.S. PATENT DOCUMENTS

| | | | |
|---|---|---|---|
| 3,586,949 | 5/1968 | Spear | 318/293 X |
| 4,250,435 | 2/1981 | Alley et al. | 318/439 X |
| 4,329,630 | 5/1982 | Park | 318/269 X |
| 4,468,546 | 8/1984 | Kinzl et al. | 318/286 X |
| 4,481,786 | 11/1984 | Bashark | 318/438 X |
| 4,680,515 | 7/1987 | Crook | 318/439 X |
| 4,748,388 | 5/1988 | Muller | 318/439 X |
| 4,749,927 | 7/1988 | Rodal et al. | 318/439 X |

Primary Examiner—William M. Shoop, Jr.
Assistant Examiner—A. Jonathan Wysocki
Attorney, Agent, or Firm—Wenderoth, Lind & Ponack

[57] ABSTRACT

A motor is connected in series with a power supply through a reversing device for reversing the direction of rotation of the motor and a speed control circuit. The reversing device includes two switches normally in a standby position in which the supply circuit of the motor is open. A command device is capable of alternatively and temporarily switching the switches into an operating position, for starting the motor in the respective opposite directions of rotation, when it receives a signal to do so from detector elements which generate the signal only when they detect a condition of normal operation of the control device of the motor.

15 Claims, 4 Drawing Sheets

CIRCUIT FOR CONTROLLING ROTATIONAL DIRECTION AND ROTATIONAL SPEED OF AN ELECTRIC MOTOR

BACKGROUND OF THE INVENTION

The present invention refers to a control device for a universal electric motor.

As is already known, a universal motor is a motor with serial excitation whose speed of rotation can be regulated, for example, by modulating the supply voltage of the motor itself by means of a control circuit of the phase control type or the pulse width modulation type.

Normally, the rotor of the universal motor is associated with a speed transducer (for example, a tachometer generator) capable of providing the control circuit with a signal proportional to the effective speed of rotation of the motor. The control circuit compares that signal with a corresponding reference signal and controls the power supplied to the motor in proportion to the error signal resulting from that comparison, in order to maintain the desired speed of operation at a substantially constant value. Universal motors and their respective control devices are commonly utilized, for example, for driving the rotating basket of washing machines, in which the basket must be driven alternatively in opposite directions of rotation during predetermined operational phases.

For this purpose, the control device also comprises a reversing device for reversing the rotation of the motor which is substantially comprised of a switch and two contacts which are controlled (for example, by a control device associated with a programmer of the washing machine) to simultaneously switch between a first and a second position.

These contacts are connected to the field winding terminals (or to the armature winding) in such a way that in the first and second positions, the field winding is always connected in series with the armature winding and the power supply, but in respectively opposite directions of the windings.

Consequently, the motor rotates in one direction or the other according to whether the contacts of the reversing device are in the first or the second position.

Because the speed control circuit (or at least its power supply portion) is substantially connected in series with the motor and the electrical power supply source, the full voltage is applied to the motor in the case of a possible short circuit of the power supply portion of the control circuit.

The same thing can happen in the case of a failure of the speed transducer, which, for example, may erroneously signal a stopped condition of the motor, or a lower motor speed than the actual speed.

In both of these cases, the motor tends to turn at an extremely high speed which is likely to damage the housing in which it is mounted; this phenomenon is particularly serious in a case where the reversing device is activated in the direction of rotation of the motor.

To eliminate such an eventuality it was proposed to connect the motor in series with a normally closed electrical safety switch which is capable of being opened by turning off the excitation of the motor itself whenever the full voltage is applied to it.

The safety switch can be a centrifugal switch capable of being opened when the motor exceeds a predetermined rotational speed; in such a case, however, the switch is relatively complex and not very reliable, as well as imprecise in its functioning.

Alternatively, the safety switch may be activated by a relay, or similar device, capable of being excited by opening the switch when the signal generated by the speed transducer of the motor exceeds a predetermined figure. In particular, this signal controls a device which closes the relay when the signal has a value higher than that of a reference signal; this solution still becomes undesirably complex. Furthermore, in order to ensure a sufficient functioning safety, the relay must be associated with a self-sustaining electric circuit which further complicates the control device and absorbs electric power excessively when the relay is closed.

A simpler solution was also proposed, consisting of connecting a suitably calibrated fuse in series with the motor to open the electrical feed circuit when the current exceeds a predetermined safety factor. However, this solution is not satisfactory either, since the fuse easily deteriorates with the passage of time, even under the correct operating conditions, and hence tends to disable the feed circuit of the motor mistakenly.

SUMMARY OF THE INVENTION

The object of the present invention is to provide an especially simple and reliable control device for universal electric motors, able to provide optimal safety conditions in case of a short-circuit in the control circuit of the motor and/or a failure in the speed transducer.

According to the present invention, this object is achieved by providing a control device for a universal electric motor comprising field winding and an armature winding, capable of being connected in series with a power supply through a reversing device for reversing the motor's direction of rotation and a speed control circuit.

The latter is capable of modulating the voltage of the power supply in accordance with a control signal supplied to the control circuit, the signal being generated by a speed transducer with a value proportional to the speed of rotation of the motor. The reversing device comprises first and second switching elements which are separate from each other, wherein each switching element can be switched between a normal standby position in which the feeder circuit of the motor is open and an operating position in which the terminals of one of the windings are respectively connected to a first and a second phase, or vice versa, of the power supply. A timed control device alternatively activates the switching elements to switch them temporarily from the standby position to the operating position when it receives a signal to do so from detector elements which generate the signal only when they detect a condition of normal operation of the control device of the motor.

BRIEF DESCRIPTION OF THE DRAWINGS

The characteristics and advantages of the present invention will be clarified by the following description, which is only in the nature of an example, non-limiting, with reference the attached diagrams, in which.

DETAILED DESCRIPTION OF THE PREFERRED EMBODIMENT

Figure 1:
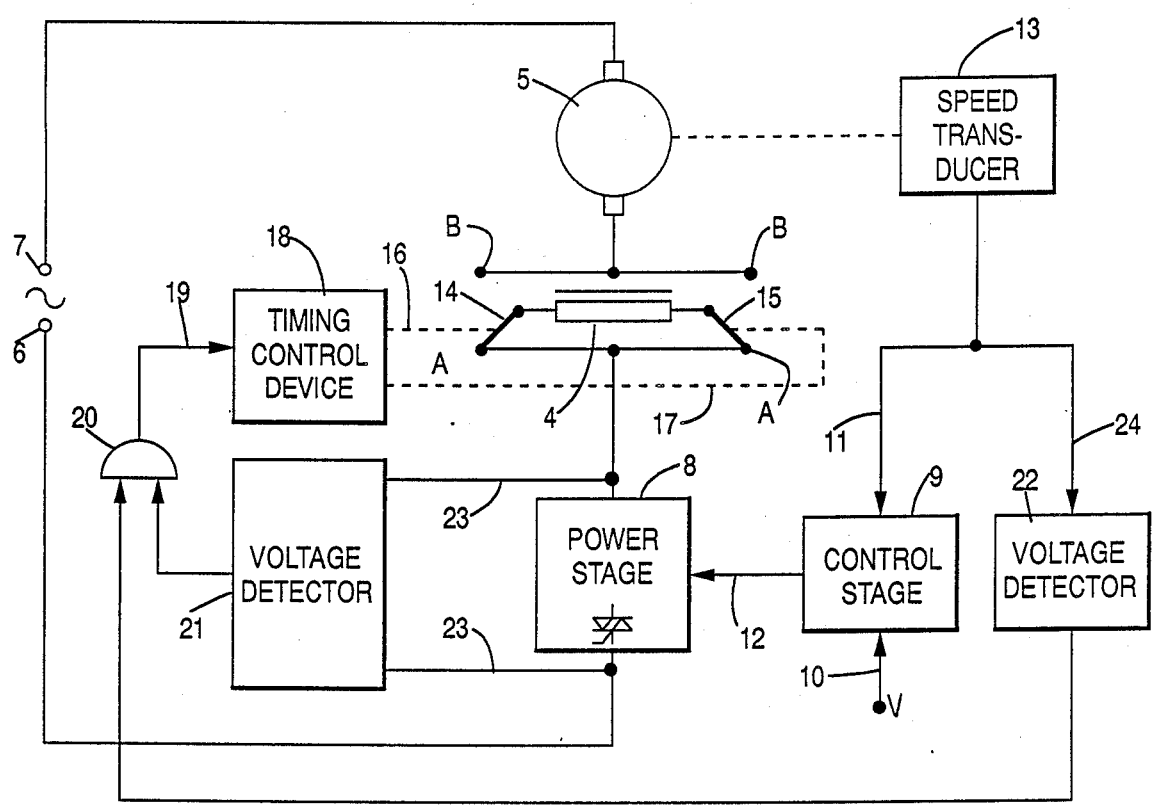
FIG. 1 shows schematically a preferred embodiment of a control device according to the present invention, with the motor disconnected.

With reference to FIG. 1, the universal motor to be controlled comprises a field winding, or stator, 4 and an armature winding, or rotor, 5.

For example, the rotor 5 is capable of rotating the basket of a washing machine, not shown in the interest of simplicity.

The motor is connected to an electrical power supply (sinusoidal, for example) in series with a device used to reverse the direction of rotation of the motor and also in series with a speed control circuit of the motor itself. In particular, the motor is connected in series with a power stage 8 of the control circuit which may comprise the usual TRIAC power control circuit. A control stage 9 of the control circuit is equipped with a reference input 10 and an input 11 to which a control signal is supplied, the control signal being generated by a speed transducer 13. The control stage may comprise a Motorola integrated circuit TDA 1085 which is specifically designed for washing machine control applications.

The speed transducer 13 is, for example, a tachometer generator which is mechanically driven by the rotor 5 and the control signal generated by it has a value proportional to the speed of rotation of the motor.

The output 12 of the stage 9 of the control circuit controls the power stage 8 by modulating the voltage of the power supply 6,7, in accordance with the value of the control signal generated by the transducer 13, and does this in order to maintain the rotational speed of the motor at a constant value determined by the value of a signal V supplied at the reference input 10 of the stage 9.

For example, the power stage 8 includes at least one controlled switch (e.g. - thyristor) and constitutes with the stage 9 a control circuit of the phase control type.

The reversing device includes first and second switches 14 and 15 which are separated from each other. Each switch has its respective moveable contact connected to an associated terminal of the field winding 4 and is capable of being connected to either a fixed contact A or fixed contact B. When the switches 14 and 15 are in their normal or standby position, as shown in FIG. 1, the respective moveable contacts are connected to the contacts A (connected to each other), by which both the field winding terminals 4 are connected to the terminal 6 of the power source through the power stage 8.

When instead, the switches 14 and 15 are in their operating position in which the moveable contacts are connected to the contacts B (connected to each other) both of the winding terminals are connected to the terminal 7 of the power supply through the armature 5.

The switches 14 and 15 can be operated separately by the respective outputs (indicated by numerals 16 and 17 in FIG. 1 and comprising, for example, respective relays) of a timing control device 18 known and associated with, for example, washing machine programmers.

The timing control device 18 may include a Motorola 6804 or 6805 microprocessor whose output drives, through appropriate transistors, relays controlling switches 14 and 15. The relays may be of the common SPDT type.

Alternatively, the timing control stage 18 may comprise a Texas Instrument 555 timer integrated circuit connected to a Sprague ULN 2003 array of transistors.

Figure 2:
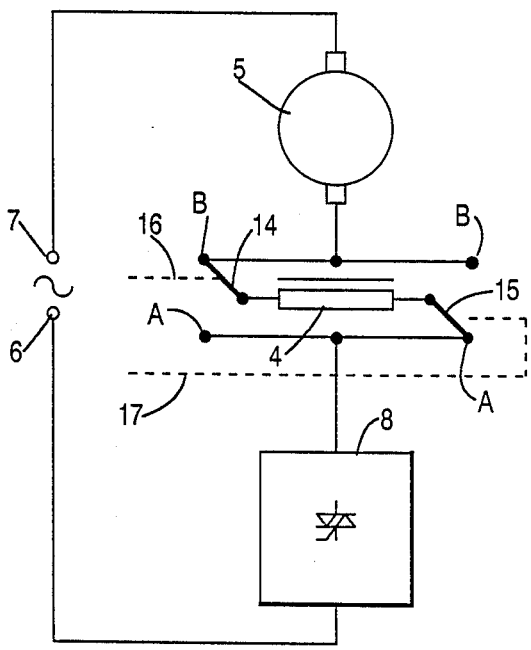
FIGS. 2 and 3 show only the power supply portion of the control device of FIG. 1, in its two respective operating states.

According to one aspect of the present invention, the timing control device 18 is capable of alternatively operating the switches 14 and 15 (in predetermined operational phases of the washing machine) to switch temporarily from the position A to the position B. Therefore, when switch 14 is temporarily placed in position B, (see FIG. 2) the field winding 4 is connected to the power supply terminals 6 and 7 in series with the armature 5 in such a way as to cause the rotation of the motor in a predetermined direction, for example, in a clockwise direction.

Figure 3:
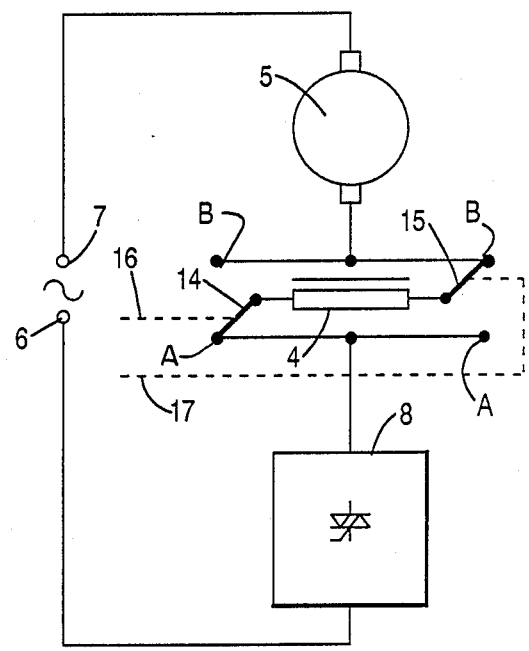

When instead the switch 15 is temporarily placed in position B (See FIG. 3), the field winding 4 is connected to the power source and in series with the armature 5 in an opposite direction, so as to cause the rotation of the motor in the reference direction, that is, in a counter-clockwise direction. In short, the function of the motor is entirely traditional.

Also, according to another aspect of the present invention, the timing control device 18 is capable of activating the switches 14 and 15 as described above only when it receives at its input 19 a signal to do so, for example, a logic signal having a predetermined level. For this purpose, the input 19 is connected to the output of an "AND" gate 20, the inputs of which are in turn respectively connected to the outputs of respective voltage detector stages 21 and 22. The stages 21 and 22 are substantially identical to each other and respectively comprise known voltage detection circuits, which output a logic signal having a predetermined level, provided that the input voltage supplied thereto does not drop below a threshold value at least for a given period of time T.

Figure 5:
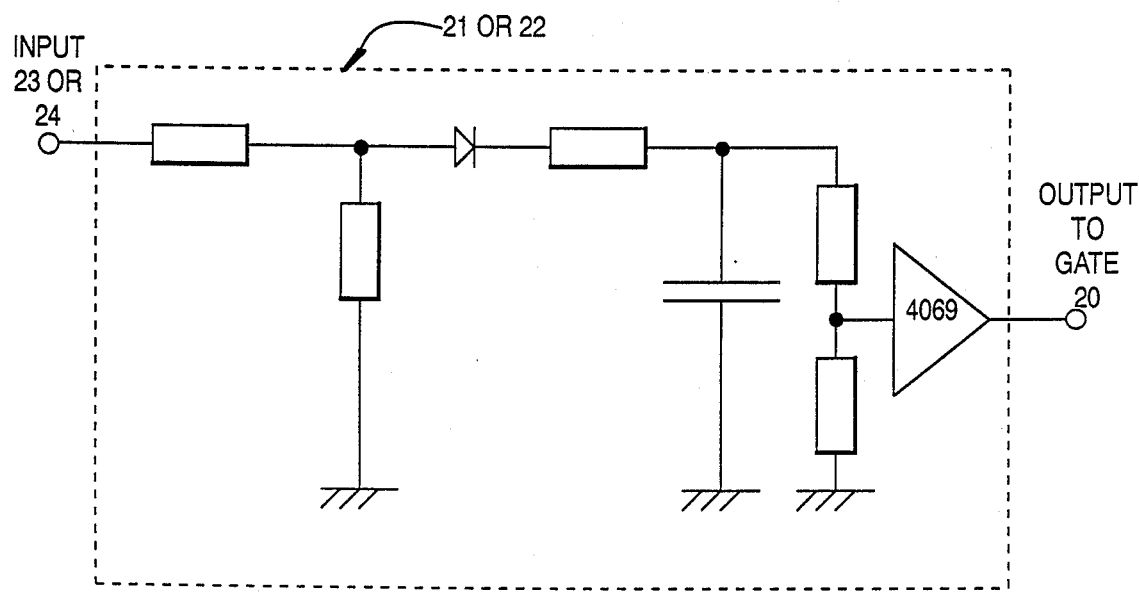
FIG. 5 is a diagram of a circuit which may be used for either of the detectors 21 and 22.

FIG. 5 illustrates one possible configuration for such a voltage detection circuit which comprises a voltage divider feeding an RC integrator circuit through a half wave rectifier. The output of the integrator circuit feeds a a comparator circuit.

At the input (schematically indicated by 23 in FIG. 1) of the detector 21, the supplied input voltage is the voltage across the power stage 8, while the input 24 of the detector 22 is supplied with the voltage output by the speed transducer 13.

Obviously, the various circuits which compose the control device of FIG. 1 are dimensioned appropriately, in function of the degree of safety desired in the functioning. In particular, the period of time period T of the detector 21 is preferably greater than the period of the voltage the power supply terminals 6 and 7 in order to avoid an erroneous action of the detector 21 during the periods of conduction of the power stage 8. Also, the period of time T of the detector 22 (which can be different from that of the detector 21) is preferably greater than the period of time normally utilized by the rotor 5 at the programmed speed, to avoid an erroneous action of the detector 22 during the start-up operation of the motor.

Therefore, if the motor and the control devices are functioning normally, the detectors 21 and 22 continuously supply at the input 19 of the control device 18, through the AND gate 20, the signal necessary to activate the switches 14 and 15 as described previously.

In the case instead of a short-circuit of the power stage 8 of the speed control circuit, the voltage at the input 23 of the detector 21 becomes equal to zero, by which, after the period of time T has elapsed, the detector 21 generates a logic signal output with a value, for example, of zero.

Analogously, in the case of a failure of the speed transducer 13 (for example, an open tachometer generator winding) or in the case of a substantially locked rotor condition, the signal at the output of the transducer 13 drops below the threshold value of the detector 22; therefore, after the period of time T has elapsed, the detector 22 generates a logic signal output with a value, for example, of zero.

In both cases, the input 19 of the control device 18 does not receive the enable signal any more from the gate 20, so that the device 18 becomes inoperative and both the switches 14 and 15 remain in the position A as shown in FIG. 1, interrupting the powering of the universal motor.

According to the present invention, therefore, the switches 14 and 15 perform the double function of reversing the direction of rotation of the motor and as a safety device capable of preventing, in the case of failures, the motor's being excessively overloaded. Principally, this is achieved by the fact that, contrary to the solutions known in the art, the field winding 4 does not always remain connected in series with the armature 5 through one of the switches 14 and 15.

On the contrary, the feeder circuit of the motor is automatically open whenever at least one of the detectors 21 and 22 ceases to detect a condition of normal operation of the control device.

Obviously the control device described can be subjected to numerous modifications which are still within the scope of the present invention.

For example, the standby position of the switches 14 and 15 can be position B, as well as position A, or can be connected to the respective terminals of the armature winding 5, as well as to the field winding 4. Also, the speed control circuit consisting of stages 8 and 9, can be of different types, for example, a pulse width modulation type.

Naturally, it is obvious to one skilled in the art that the speed transducer 13 or the logic circuit by which the detectors 21 and 22 show the functioning conditions of the control device and thus govern the control device 18, can also be different.

It is also evident to one skilled in the art that the switching elements used to control the activation of the motor as described above can be different and/or arranged differently.

Figure 4:
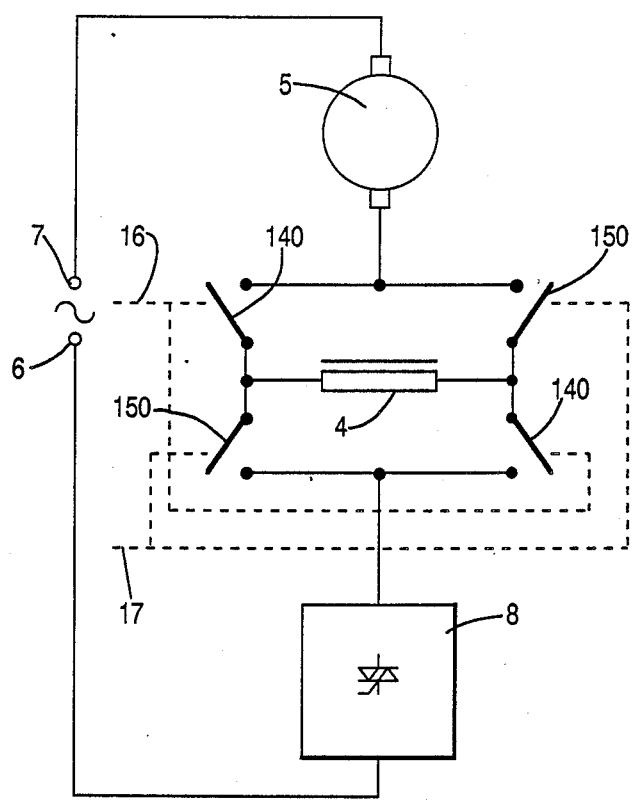
FIG. 4 only the power supply portion of another embodiment of a control device according to the present invention, with the motor disconnected.

For example, according to the other embodiment shown in FIG. 4, the switches 14 and 15 can be replaced by respective pairs of controlled switches 140 and 150, of the electromechanical or electronic type which may consist of commercially available DPST relays. Each one of the pairs of such switches 140 and 150, normally open as in FIG. 4, is switched at the same time by respective outputs 16 and 17 of the timing control device 18 and is connected in such a way as to form opposite sides of a bridge circuit, one of which is diagonal and constituted by the field winding 4 (or by the armature winding 5) of the motor. The other diagonal of the bridge circuit is connected instead, across the armature winding 5 (or the field winding 4) and through the power stage 8 to the power source terminals 6 and 7. Analogously to what is described previously, the control device 18 alternately temporarily switches the pairs of switches 140 and 150 to their operating position, so as to supply the field winding 4 alternately in one direction or in the opposite one, thus to cause the activation of the motor in respective opposite rotation directions As is the purpose of the present invention, the switches 140 and 150 are automatically opened, turning off excitation of the motor, whenever there is detected, as previously described, an anomalous operating condition of the motor control device and/or the motor itself.

In any case, detector devices equivalent to detectors 21 and 22 can be provided to control the correct functioning of any other component associated with the device according to the present invention.

We claim:

1. A control circuit for controlling a rotational direction and a rotational speed of an electric motor driven by a power source having first and second terminals, particularly an electric motor having a field winding portion having first and second terminals and an armature portion operatively connected to a speed transducer which outputs a rotational speed signal having a value proportional to the rotational speed of the motor, said control circuit comprising:

switching means for selectively electrically connecting the electric motor to the power source and for establishing the rotational direction of the electric motor;

control means, serially connected to said switching means, for establishing a voltage level applied to the electric motor in accordance with a value of a control signal input thereto;

control signal generating means, connected to said control means and having means for connection to the speed transducer, for establishing the value of the control signal in accordance with a predetermined voltage level and the rotational speed signal output by the speed transducer, and for outputting the control signal to the control means;

timing control means, connected to said switching means and said control means and said control signal generating means, for causing said switching means to establish the rotational direction of the electric motor in accordance with a received rotational direction signal, and for identifying a failure according to at least one of said control means and said control signal generating means, and for causing said switching means to electrically disconnect the electric motor from the power source upon identifying a failure according to at least one of said means and said control signal generating means.

2. A control circuit as recited in claim 1, wherein said switching means comprises:

a first switching device having first and second switching positions, said first switching position for electrically connecting the first terminal of the field winding to the first terminal of the power source, said second switching position for electrically connecting the first terminal of the field winding to the second terminal of the power source; and a second switching device having first and second switching positions, said first switching position for electrically connecting the second terminal of the field winding to the first terminal of the power source, said second switching position for electrically connecting the second terminal of the field winding to the second terminal of the power source.

3. A control circuit as recited in claim 1, wherein said switching means includes:
- first and second switching devices for respectively electrically connecting the first terminal of the field winding to the first terminal and the second terminal of the power source; and
- third and fourth switching devices for respectively electrically connecting the second terminal of the field winding to the first terminal and the second terminal of the power source.

4. A control circuit as recited in claim 1, wherein said control means includes:
- power control circuitry, serially connected to said switching means and having means for serially connecting to the power source and connected to said control signal generating means, for modulating a voltage supplied by the power source according to said control signal; and
- voltage detecting means for detecting a voltage of said power control circuitry and for outputting a failure signal when said voltage of said power control circuitry has a value which is less than a preselected value for a preselected period of time.

5. A control circuit as recited in claim 2, wherein said control means includes:
- power control circuitry, serially connected to said switching means and having means for serially connecting to the power source and connected to said control signal generating means, for modulating a voltage supplied by the power source according to said control signal; and
- voltage detecting means for detecting a voltage of said power control circuitry and for outputting a failure signal when said voltage of said power control circuitry has a value which is less than a preselected value for a preselected period of time.

6. A control circuit as recited in claim 3, wherein said control means includes:
- power control circuitry, serially connected to said switching means and having means for serially connecting to the power source and connected to said control signal generating means, for modulating a voltage supplied by the power source according to said control signal; and
- voltage detecting means for detecting a voltage of said power control circuitry and for outputting a failure signal when said voltage of said power control circuitry has a value which is less than a preselected value for a preselected period of time.

7. A control circuit as recited in claim 1, wherein said control signal generating means includes voltage detection means for detecting a voltage level of the rotational speed signal output by the speed transducer, and for outputting a failure signal when the voltage level of the rotational speed signal is less than a preselected voltage level for a preselected period of time.

8. A control circuit as recited in claim 2, wherein said control signal generating means includes voltage detection means for detecting a voltage level of the rotational speed signal output by the speed transducer, and for outputting a failure signal when the voltage level of the rotational speed signal is less than a preselected voltage level for a preselected period of time.

9. A control circuit as recited in claim 3, wherein said control signal generating means includes voltage detection means for detecting a voltage level of the rotational speed signal output by the speed transducer, and for outputting a failure signal when the voltage level of the rotational speed signal is less than a preselected voltage level for a preselected period of time.

10. A control circuit as recited in claim 1, said control means including: power control circuitry, serially connected to said switching means and having means for serially connecting to the power source and connected to said control signal generating means, for modulating a voltage supplied by the power source; and, first voltage detecting means for detecting a voltage of said power control circuitry and for outputting a first failure signal when said voltage of said power control circuitry has a value which is less than a first preselected value for a first preselected period of time;
- said control signal generating means including a second voltage detection means for detecting a voltage value of the rotational speed signal output by the speed transducer, and for outputting a second failure signal when the voltage value of the rotational speed signal is less than a second preselected value for a second preselected period of time.

11. A control circuit as recited in claim 2,
- said control means including: power control circuitry, serially connected to said switching means and having means for serially connecting to the power source and connected to said control signal generating means, for modulating a voltage supplied by the power source; and, first voltage detecting means for detecting a voltage of said power control circuitry and for outputting a first failure signal when said voltage of said power control circuitry has a value which is less than a first preselected value for a first preselected period of time;
- said control signal generating means including a second voltage detection means for detecting a voltage value of the rotational speed signal output by the speed transducer, and for outputting a second failure signal when the voltage value of the rotational speed signal is less than a second preselected value for a second preselected period of time.

12. A control circuit a recited in claim 3,
- said control means including: power control circuitry, serially connected to said switching means and having means for serially connecting to the power source and connected to said control signal generating means, for modulating a voltage supplied by the power source; and, first voltage detecting means for detecting a voltage of said power control circuitry and for outputting a first failure signal when said voltage of said power control circuitry has a value which is less than a first preselected value for a first preselected period of time;
- said control signal generating means including a second voltage detection means for detecting a voltage value of the rotational speed signal output by the speed transducer, and for outputting a second failure signal when the voltage value of the rotational speed signal is less than a second preselected value for a second preselected prior of time.

13. A control circuit as recited in claim 10, wherein said timing means causes said switching means to electrically disconnect the electric motor from power source upon receiving at least one of said first failure signal from said first voltage detecting means and said second failure signal from said second voltage detecting means.

14. A control circuit as recited in claim 11, wherein said timing means causes said switching means to electrically disconnect the electric motor from power source upon receiving at least one of said first failure signal from said first voltage detecting means and said second failure signal from said second voltage detecting means.

15. A control circuit as recited in claim 12, wherein said timing means causes said switching means to electrically disconnect the electric motor from power source upon receiving at least one of said first failure signal from said first voltage detecting means and said second failure signal from said second voltage detecting means.

* * * * *